June 11, 1963 W. B. LEW 3,093,383
ROTARY SHAFT FACE SEAL
Filed April 24, 1961

INVENTOR.
WAH B. LEW
BY
ATTORNEYS

3,093,383
ROTARY SHAFT FACE SEAL
Wah B. Lew, Bremerton, Wash., assignor to the United States of America as represented by the Secretary of the Navy
Filed Apr. 24, 1961, Ser. No. 105,240
1 Claim. (Cl. 277—92)
(Granted under Title 35, U.S. Code (1952), sec. 266)

The invention described herein may be manufactured and used by or for the Government of the United States of America for governmental purposes without the payment of any royalties thereon or therefor.

The present invention relates to the sealing of rotary shafts and, in particular, to shaft face seals adapted to contain fluid and keep out dirt and other foreign particles.

To illustrate the problems solved by the present invention, it is known that custom-made seals are available in which oil is sealed in a bearing chamber by a bronze ring which presses against a hardened and lapped washer or flange, springs conventionally being used to provide an evenly distributed pressure on the bronze seal ring. In this instance, the integral sealing member is waterproof fabric and the seal itself is commonly known as a fabric diaphragm outseal.

The initial effectiveness of such seals is not presently in question. However, regardless of this effectiveness, it is recognized that substantial difficulties may be presented when renewal of the sealing member is required due to wear or deterioration. Specifically, when renewal is required, the job usually must be accomplished by slipping the sealing member over the shaft and, as will be appreciated, this operation frequently involves substantial labor and relatively high costs because the entire shaft assembly may have to be dismantled to provide a free end over which the seal can be slipped.

It is therefore a primary object of the present invention to provide a rotary face-type shaft seal, the sealing member of which can be renewed simply, economically and expeditiously.

Another object is to provide such a readily replaceable seal which itself is of relatively simple inexpensive construction and which, nevertheless provides an unusually effective sealing action.

A more specific object is to provide a seal and seal holder combination in which the seal accepts substantially all of the wear, and in which the worn seal can be replaced without disturbing the holder.

Another object is to provide a seal according to the foregoing objects in which the sealing members provide take-up and seal compression so as to seal under conditions of shaft vibration and axial movement.

These and other objects which will become apparent in the ensuing description and claims are achieved principally by utilizing a seal holder provided with a groove into which is fitted two or more helically-wound sealing strips. The holder, which preferably is a hard rubber disc secured to a metal backing piece, is adapted to rotate with the shaft to be sealed, and the strip-receiving groove, most suitably, is formed in a face of the disc concentric to the shaft. Also, in the preferred form, the groove is rectilinear in cross section while the sealing strips are flat thin pieces of material capable of being easily wound and seated in the groove.

Another feature of the invention is the fact that the helically-wound strips project outwardly of the face of the holder disc so as to constitute the only member of the combination which, in operation, is frictionally engaged so as to become worn. For example, sealability in applications of the type presently under consideration conventionally is achieved by a frictional engagement between a gasket and a metal flange which may be pressed against the gasket by suitable springs. In the present instance, the sealing strips themselves protrude outwardly of the seal holder so as to be the only members frictionally engaging the metal flange. Consequently, these strips normally will be the only members requiring replacement or renewal which, in turn, can be accomplished very easily simply by removing the worn ones and then winding new ones into the groove of the holder. The prime consideration is that such a replacement operation does not require any disturbance of the shaft such as is necessary when gasket type members must be slipped over the shaft. In the present arrangement, the strips are wound into place and do not need to be slipped over the shaft.

Structurally considered, the sealing strips are formed of an abrasion-resistant material such as a synthetic fabric or glass, and this material either may be impregnated or skin-coated with an elastomeric material so as to provide rubber-like flat surfaces. The abrasion-resistant characteristic of the sealing strips is to minimize wear, while their rubber-like surfaces provide the sealability. The helical winding of the strips may be accomplished simply by overlapping the ends of each strip a rather small amount to provide a sealing joint and, most suitably, these sealing joints are disposed one from the other a maximum distance. Thus, when two strips are employed the joints may be diametrically opposed.

The invention is illustrated in the accompanying drawings in which FIG. 1 is a central section through a shaft on which the sealing apparatus of the invention is mounted;

Figure 1:
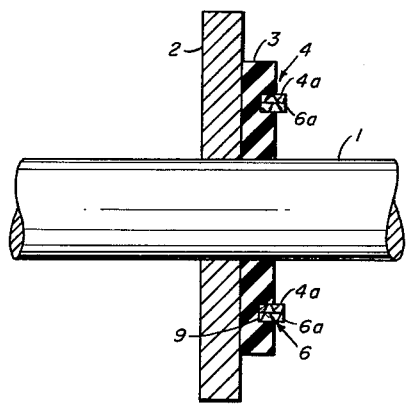

Referring to the drawings, and particularly to the FIG. 1 modification, the sealing structure is mounted on a shaft 1 which may be viewed as the rotary shaft of the gear box, the seal being needed to keep oil and grease in the box and to keep dirt out. Of course, the sealing structure is intended for many other similar purposes and applications which will be apparent to those skilled in this art.

Figure 5:
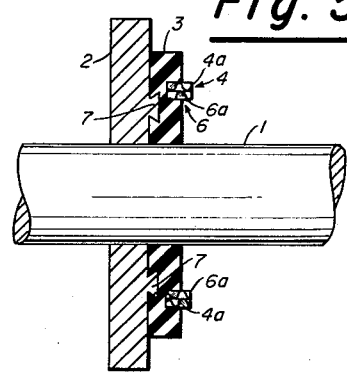
FIGS. 5 and 6 are illustrative of modifications particularly with regard to the seal holder.
Figure 6:
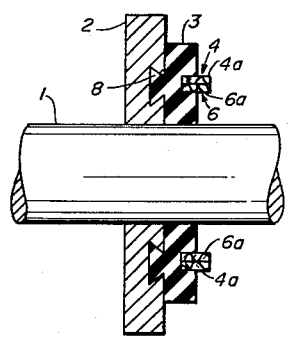

As the structure itself, it generally includes a metal backing disc member 2, a synthetic rubber seal holder 3 and special sealing strips 4 and 6. Metal backing 2 may be keyed or otherwise fixedly secured to shaft 1 so as to rotate with it, while seal holder 3 may be cemented to the backing disc or, as shown in FIGS. 5 and 6, it may be mechanically interlocked by the use of mating keys and recesses. Thus, in the FIG. 5 modification, the seal holder is provided with a recess shaped to receive a keying flange 7 integrally formed on backing disc 2. The FIG. 6 modification is simply the reverse of the mechanical interlock of FIG. 5, the recess being formed in the backing disc and a mating flange 8 integrally provided on seal holder 3. As will be appreciated, the purpose of the mechanical interlock is to permit replacement of the seal holder and its use is recommended in applications where the holder itself may deteriorate due to constant chemical or heat attack. In this regard, it is to be noted that the holder 3 preferably is formed of a synthetic hard rubber which should be of a type capable of resisting such deterioration, or, in fact, deterioration due to any effects of the media being sealed.

An important feature resides in the use of sealing strips 4 and 6 and, especially, in the particular manner in which these sealing strips are employed to create an effective seal. Thus, as may be noted in FIGS. 1 and 2, these two strips are wound into a circular groove 9 provided in a flat-faced portion of seal holder 3, the strips having sufficient width so that, when firmly seated in the groove, they have portions 4(a) and 6(a) protruding outwardly from the face of the holder. These protruding ends, in turn, are adapted to bear against a metal flange or other appropriate structural member (not shown) so as to frictionally establish a sealing engagement. As in the more conventional face seals which utilize a gasket as the sealing member, the flange may be spring-pressed toward the sealing strips although the strips themelves provide take-up and seal compression capable of compensating for considerable shaft vibration or axial movement.

Figure 2:
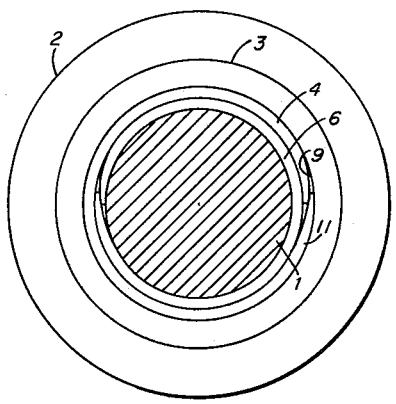
FIG. 2 is an end view of the sealing strips themselves wound together as a unit.

Structurally, sealing strips 4 and 6 are elongate, thin, flat members each of which, as shown in FIG. 2, is of sufficient length to provide an overlap or joint 11 when wound into the full circumference of groove 9. The winding of the strips into the groove is performed in such a manner that joints 11 of the completed structure are spaced circumferentially one from the other and, in applications such as that illustrated, the joints are spaced approximately 180° apart. However, if desired, more than two sealing strips can be used, and in such an event the joints are evenly spaced to provide maximum separation.

Figure 3:
FIG. 3 is an enlarged section of one of these strips.
Figure 4:
FIG. 4 is a cross-section through another form of sealing strip.

The particular dimensions and materials for the strips depend largely upon the particular seal to be created. Generally, however, each strip is formed of a synthetic fabric or glass cloth impregnated or skin-coated with an elastomeric material. FIG. 3 represents a laminated sealing strip structure in which the inner core or body 12 is formed of glass cloth, while outer surfaces 13 and 14 are formed of any elastomer or rubber-like material which is waterproof and which also is capable of resisting environmental conditions. FIG. 4 represents a modification in which the strip is formed of a rubber-impregnated synthetic fabric, such as canvas or other similar materials conventionally used for belting purposes.

In both of these modifications, the fabric or glass cloth provides a strengthening element primarily to resist abrasion caused by the frictional engagement of the strips with the sealing flange. It further is recognized that in some applications, where pressures are not sufficient to distort the protruding portions of the lips, rubber or leather may be employed.

Thus, depending upon the pressures encountered during use, the core or matrix of the strips should be sufficiently stiff to resist such distortion.

The rubber-like coating of the strips which, as already stated, may be achieved either by lamination or impregnation, is the element which effects sealability between the two sealing strips. In other words, when the two strips are wound into groove 9, the contiguity or continuous contact of their rubber-like surfaces provides an entirely effective seal, particularly when the ends of the strips are overlapped to form joints 11. As has been noted, a rather slight overlap of these ends is all that is required to achieve the desired purpose.

The dimensions of the strips are related to the circumference and depth of groove 9 of the seal holder. Thus, it is apparent that their length must be sufficient to permit the necessary overlap of joint 11. The width also must be sufficient to provide protruding portions 4(a) and 6(a). As to thickness, the strips should be thin enough to permit ease in the coiling or winding operation. Also, the thickness should be such as to permit a slip-fit of both strips into the groove.

The advantages of a seal of this type should be rather apparent. Primarily, the use of separate sealing strips permits renewal of the seal without disturbing the shaft or other fixed structural members. Thus, when the sealing strips, which absorb all the frictional abrasion and wear, require renewal, it only is necessary to remove the worn ones from the seal holder groove and wind a coil of new ones in their place. In contrast, with other gasket seals adapted for the same purposes, there is no need to slip the seal over the shaft.

The seal created by the strips is entirely effective even though it is unusually simple and inexpensive. The rubber-like surfaces of the two contiguously wound strips bind together sufficiently to prevent leakage, and the overlap of the strip ends further assures effectiveness. In addition to this effectiveness, the strips are adequately wear-resistant due to the fabric or glass cloth core or matrix.

The combination of the strips and the seal holder is equally beneficial in that the rubber holder engages the rubber-like strips and securely holds them in place. In operation, the strips, in protruding from the holder, provide take-up and seal compression sufficient to offset normal shaft movements. As has been noted, the holder may be mechanically interlocked with the metal backing ring so as to permit its replacement as needed.

Obviously many modifications and variations of the present invention are possible in the light of the above teachings. It is therefore to be understood that within the scope of the appended claim the invention may be practiced otherwise than as specifically described.

What is claimed is:

A rotary shaft seal comprising a seal holder rotatably carried by the shaft, said holder having a flat surface disposed substantially normal to said shaft and provided with a groove extending concentrically about the shaft, and at least two thin flat sealing strips contiguously wound together and seated in said groove with contiguously wound portions thereof projecting outwardly of said holder surface, each of said strips having its end portions overlapped for forming joints, and said joints being spaced circumferentially a maximum distance one from the other.

References Cited in the file of this patent

UNITED STATES PATENTS 2,676,823   Olson et al. _____ Apr. 27, 1954

FOREIGN PATENTS 395,969     Great Britain _____ July 27, 1933
1,117,287   France _____ May 22, 1956